United States Patent
Souza

(10) Patent No.: US 10,037,237 B2
(45) Date of Patent: Jul. 31, 2018

(54) METHOD AND ARRANGEMENT FOR FAULT MANAGEMENT IN INFRASTRUCTURE AS A SERVICE CLOUDS

(71) Applicant: Telefonaktiebolaget L M Ericsson (publ), Stockholm (SE)

(72) Inventor: Victor Souza, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 390 days.

(21) Appl. No.: 14/780,763

(22) PCT Filed: Mar. 28, 2013

(86) PCT No.: PCT/SE2013/050352
§ 371 (c)(1),
(2) Date: Sep. 28, 2015

(87) PCT Pub. No.: WO2014/158066
PCT Pub. Date: Oct. 2, 2014

(65) Prior Publication Data
US 2016/0055045 A1    Feb. 25, 2016

(51) Int. Cl.
*G06F 11/07* (2006.01)
*G06F 9/455* (2018.01)

(52) U.S. Cl.
CPC ........ *G06F 11/079* (2013.01); *G06F 9/45558* (2013.01); *G06F 11/0709* (2013.01);
(Continued)

(58) Field of Classification Search
CPC ............... G06F 9/45558; G06F 9/5077; G06F 2201/815; G06F 11/3495
See application file for complete search history.

(56) References Cited

U.S. PATENT DOCUMENTS

2003/0204780 A1    10/2003    Dawkins et al.
2004/0215916 A1    10/2004    Bennett et al.
(Continued)

FOREIGN PATENT DOCUMENTS

CN    1486093    3/2004
CN    1490724    4/2004
(Continued)

OTHER PUBLICATIONS

SIPO Search Report, Chinese Patent Application No. 201380075194.5, dated Mar. 28, 2013 (Search Report dated Jun. 5, 2017) 2 pages.
(Continued)

*Primary Examiner* — Jigar Patel
(74) *Attorney, Agent, or Firm* — Sage Patent Group

(57) ABSTRACT

A server node in an IaaS (Infrastructure as a Service) cloud includes a hypervisor arrangement and virtual machine arrangements at least a subset of which together defines at least one application utilizing the IaaS cloud. The server node includes a cloud infrastructure monitor within the hypervisor arrangement. The cloud infrastructure monitor includes a monitor arrangement monitoring an infrastructure of the IaaS cloud by monitoring a physical network, storage within the physical network, the server node, or the virtual machine arrangements. A detector arrangement detects faults within the monitored IaaS infrastructure. A notifying arrangement provides notifications of detected faults on a message bus between the hypervisor arrangement and each at least one application. The message bus relays the fault notifications from the cloud infrastructure monitor to the at least one application. Each at least one application is configured to automatically manage its operation in response to received fault notifications.

17 Claims, 8 Drawing Sheets

(52) U.S. Cl.
CPC ...... *G06F 11/0712* (2013.01); *G06F 11/0751* (2013.01); *G06F 11/0784* (2013.01); *G06F 11/0793* (2013.01); *G06F 2009/45591* (2013.01)

(56) References Cited

U.S. PATENT DOCUMENTS

| | | | |
|---|---|---|---|
| 2006/0200705 A1 | 9/2006 | Burger et al. | |
| 2007/0006227 A1 | 1/2007 | Kinney et al. | |
| 2012/0324112 A1* | 12/2012 | Dow | G06F 9/5033 709/226 |
| 2012/0324445 A1* | 12/2012 | Dow | G06F 9/45504 718/1 |

FOREIGN PATENT DOCUMENTS

| | | |
|---|---|---|
| CN | 101141417 | 3/2008 |
| CN | 102984214 | 3/2013 |

OTHER PUBLICATIONS

SIPO Office Action, Chinese Patent Application No. 201380075194.5, dated Mar. 28, 2013 (Office Action dated Jun. 19, 2017) 6 pages.
International Search Report, Application No. PCT/SE2013/050352, dated Dec. 3, 2013.
Written Opinion of the International Searching Authority, Application No. PCT/SE2013/050352, dated Dec. 3, 2013.
Amazon Web Services, "Amazon CloudWatch", downloaded May 23, 2013 from http://aws.amazon.com/cloudwatch/, 4 pp.
Amazon Web Services, "Amazon Simple Notification Service (Amazon SNS)", downloaded May 23, 2013 from http://aws.amazon.com/sns/, 4 pp.
Rackspace Cloud Monitoring, "Cloud Monitoring Tools and Services by Rackspace" downloaded May 23, 2013 from http://www.rackspace.com/cloud/monitoring/, 2 pp.

* cited by examiner

METHOD AND ARRANGEMENT FOR FAULT MANAGEMENT IN INFRASTRUCTURE AS A SERVICE CLOUDS

TECHNICAL FIELD

The present invention cloud computing in general, and specifically to improved fault management in IaaS clouds.

BACKGROUND

The term cloud computing in its most general meaning is used to describe the concept of using computing resources e.g. hardware and software that are delivered as a service over a network e.g. Internet. The name is derived from the nowadays-common use of a cloud as an abstraction for the complex infrastructure it contains in system diagrams. Another way of formulating it is that cloud computing enables convenient, on-demand network access to a shared pool of configurable computing resources (e.g. networks, servers, storage, applications, and services) that can be rapidly provisioned and released with minimal management effort or service provider interaction. Typically, cloud computing is described as a stack due to the number of services built on top of each other. These services can be divided into three main models, namely Software as a Service (SaaS), Platform as a Service (PaaS), and Infrastructure as a Service (IaaS), where IaaS is the most basic model. In brief, the different models can be described as follows:

SaaS cloud providers install and operate application software in the cloud and cloud users access the software from cloud clients. The cloud users do not manage the cloud infrastructure and platform on which the application is running.

PaaS cloud providers deliver a computing platform typically including operating system, programming, language execution environment, database and web server.

IaaS cloud providers offer computers, physical or virtual machines and other resources, which is the focus of the current disclosure and will be described further below. In particular, the current disclosure is aimed at fault management in Infrastructure-as-a-Service (IaaS) Cloud Systems. Infrastructure-as-a-Service is a delivery model in which an organization outsources the physical equipment used to support operations, including storage, hardware, servers and networking components. Usually virtualization is used as means to provide client isolation and resource multiplexing. Typically the infrastructure requested by the client may scale with time (grow or shrink). The client typically pays on a per-use basis.

Within cloud services, and in particular for IaaS clouds, one difficulty is how to handle faults that occur in e.g. the data center (physical servers, storage, network etc) and how these faults affect the applications or services that utilize the cloud. Since an application or service is unaware of the hardware functionality of the infrastructure, it is difficult to implement any way of handling faults. Today there exist a number of different methods of handling faults in a cloud infrastructure.

Rackspace, one of the largest IaaS providers in USA, has defined a Cloud Monitoring Application Programming Interface (API) [1]. That API is RESTful based and allow for creation of checks, alarms, notification plans, amongst others. If a check condition is detected, an alarm is fired, and a notification plan can be used. However, a notification plan is a plain e-mail that is sent to a human operator, which in its turn can act on the matter. A webhook is also supported but it does not notify the application itself either.

Amazon WS has also provided relevant related solutions to that problem. A good example is the Amazon CloudWatch [2], a service that monitors the performance of VMs through metrics. If a metric is outside of specified levels, the cloud management system may take actions. The defined metrics are CPU utilization, latency and request counts, or custom. The types of alarms raised are OK, ALARM, or INSUFICIENT_DATA (no reading was possible).

However, this solution focuses only on the performance VMs, not providing a full framework for fault monitoring and notification.

Another relevant service is the Amazon Simple Notification Service [3]. It provides a way for applications to notify events to subscribers typically used for implementing the application logic itself. It builds on top of the Simple Queue Service (a service similar to the one used in this invention). However, this is only a notification bus as any other; it does not provide a solution for fault monitoring.

Consequently, there is a need for methods and arrangements for enabling improved fault monitoring and management in IaaS clouds.

SUMMARY

The present invention relates to fault management in an IaaS cloud.

According to a first aspect, the present disclosure presents a server node in an IaaS (Infrastructure as a Service) cloud, which server node comprises a hypervisor arrangement and a plurality of virtual machine arrangements at least a subset of which together define at least one application utilizing the IaaS cloud. The server node further comprises a cloud infrastructure monitor within the hypervisor arrangement. The cloud infrastructure monitor comprises a monitor arrangement configured for monitoring an infrastructure of the IaaS cloud by monitoring at least one of a physical network, storage within the physical network, the server node, or at least one of said plurality of virtual machine arrangements, and a detector arrangement configured for detecting faults within the monitored IaaS infrastructure, and a notifying arrangement configured for providing notifications of detected faults on a message bus. The server node further includes a respective message bus arranged between the hypervisor arrangement and each at least one listening application for relaying fault notifications from the cloud infrastructure monitor to the at least one listening application. Finally, each at least one application is configured to automatically manage its operation in response to received fault notifications.

According to a second aspect, the present disclosure presents a method of fault management in a server node in an IaaS cloud, which server node comprises a hypervisor arrangement and a plurality of virtual machine arrangements at least a subset of which together defining at least one application utilizing the IaaS cloud. The method includes the steps of monitoring an infrastructure of the IaaS cloud by monitoring at least one of a physical network, storage arrangements within the physical network, the physical server node, or at least one of said plurality of virtual machine arrangements. Further, the method includes the steps of detecting a fault in the monitored IaaS infrastructure, notifying the at least one application of a detected fault on a respective message bus arranged between the hypervisor arrangement and each at least one application. Finally, the method includes the step of automatically managing the operation of each at least one application based on the fault notifications.

Advantages of the present disclosure includes enabling each application to automatically manage and recover from monitored and detected fault conditions in the IaaS cloud.

BRIEF DESCRIPTION OF THE DRAWINGS

The invention, together with further objects and advantages thereof, may best be understood by referring to the following description taken together with the accompanying drawings, in which.

ABBREVIATIONS

AMQP Advanced Message Queuing Protocol
API Application Programming Interface
CIM Cloud Infrastructure Monitor
CPU Central Processing Unit
IaaS Infrastructure as a Service
NIC Network Interface Card
PaaS Platform as a Service
SaaS Software as a Service
VM Virtual Machine

DETAILED DESCRIPTION

The present disclosure concerns improved fault management in an IaaS cloud. For simplicity reasons the disclosure mainly describes the function with relation to one physical server node in an IaaS cloud. However, it is easily adapted to a case of multiple physical server nodes in a datacenter.

As specified above in the background section, existing solutions either demand human intervention or take generic actions in the case of fault. Telecommunication applications demand more control over the behavior in the case of failure (e.g., for implementing high-availability). Moreover, and as identified by the inventors, smarter actions may be taken if the application itself can decide what to do when specific faults occur.

One of the problems solved by this disclosure is the one of letting the applications decide what action to take in the case of a failure. In the past years, the technology has moved from single stand-alone web-servers to complex multi-server applications. Applications are broken down into smaller services that can be independently deployed on a virtual machine and independently scaled. These multi-server applications are deployed in cloud datacenters.

Figure 1:
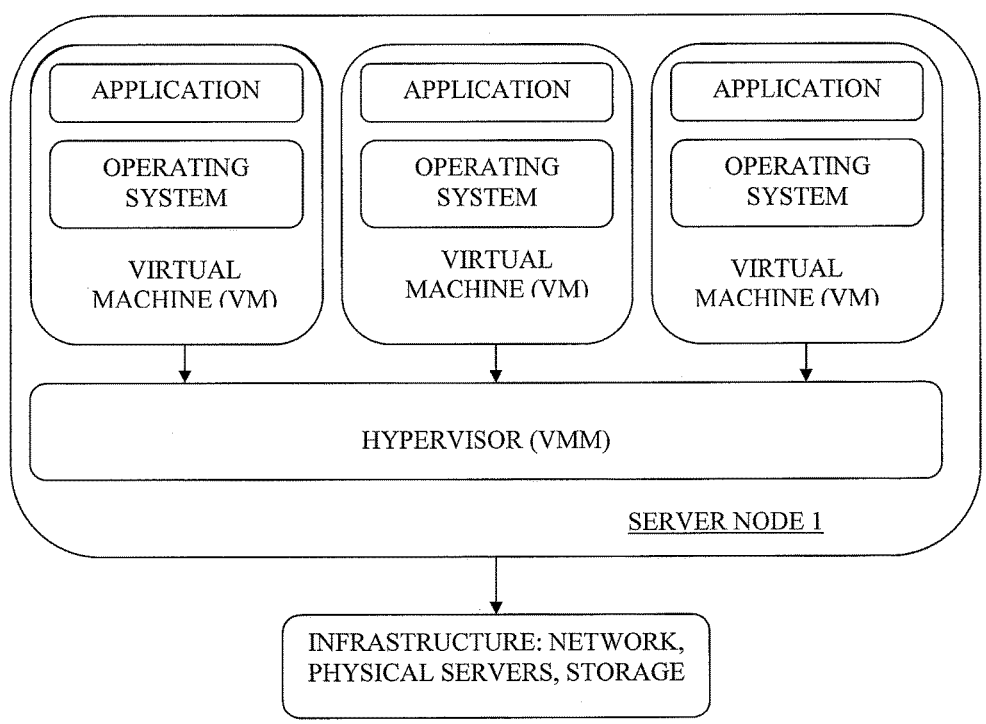
FIG. 1 is a schematic overview of an IaaS cloud.

The problem solved by this disclosure relates to the situation where a failure occurs in this environment. Two main problems relating to failures in IaaS clouds arise:

Applications typically run on a virtualized environment (e.g., a virtual machine) and they have no view on what is happening beneath (hypervisor and hardware), see FIG. 1. In the case of some failure, the application has no means of knowing the location or nature of the failure e.g. whether it is a networking failure, a hypervisor failure, or a storage failure.

When failures occur, a human operator is notified of it and may take actions. Alternatively, the cloud system may be pre-configured to take automated actions. However, it is clear that the application is more suited for taking such decisions, since they are very dependent on the application logic and type of failure.

The inventors of the present disclosure have identified the possibility to implement a monitor arrangement and function or cloud infrastructure monitor (CIM) in each hypervisor arrangement, which monitors the IaaS cloud infrastructure and notifies relevant applications that are affected by the detected fault. In addition the applications are configured to automatically manage their respective operation, either singularly or cooperatively, based on notified faults.

This disclosure contains three main parts. The first one is the above-mentioned Cloud Infrastructure Monitor 3, a so-called daemon deployed in each hypervisor to monitor the health or status of different services (e.g., network, storage, the hypervisor itself). The Cloud Infrastructure Monitor 3 can monitor application parameters as well (memory consumption, request/ sec) and the virtual machine(s) which together define the application. In response to detected faults the Cloud Infrastructure Monitor 3 sends notifications of failure on a message bus 4.

The second part of this disclosure relates to the management of the message bus 4 to provide scalability. Clearly, one message bus where all Cloud Infrastructure Monitors 3 send notifications and all virtual machines (or software applications in the virtual machines) listen will not scale. The present disclosure solves this by enabling the cloud client to define an application (a set of virtual machines that depend on each other for providing a service). Then it is possible to create multiple message buses 4, one for each application. Migration of virtual machines is also supported by the disclosure, which will be described further below.

The third part of this disclosure is related to the actions taken by the application in response to a notified fault. Those actions are dependent on the type of fault and application. They may include e.g. creating a new virtual machine, moving data, redirecting requests etc.

Figure 2:
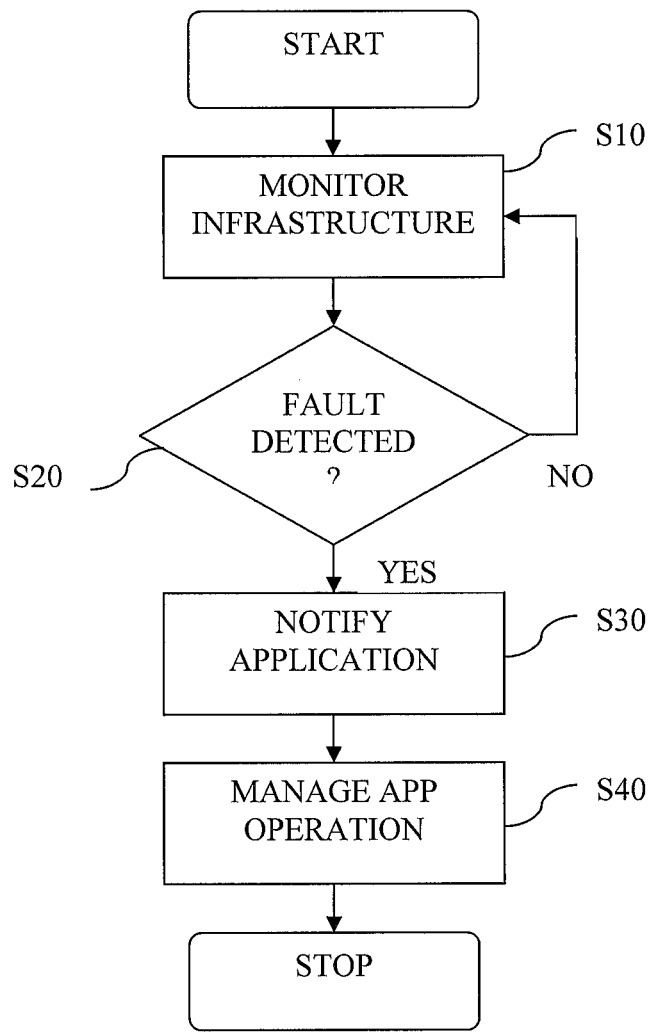
FIG. 2 is a schematic flow chart of an embodiment of the current disclosure.

With reference to FIG. 1 and FIG. 2, a basic embodiment of a method of fault management in an IaaS cloud according to the current disclosure will be described. As indicated in FIG. 1, a (physical) server node 1 includes a hypervisor arrangement or virtual machine manager (VMM) and a plurality of virtual machine arrangements (VM). At least a subset of the virtual machines together define at least one application which utilizes the IaaS cloud infrastructure. Each virtual machine arrangement also includes a respective operating system. In FIG. 1 the infrastructure is indicated as one box, which includes network, physical servers, storage etc.

As described briefly above, an embodiment of a method of fault management in a server node which comprises a hypervisor arrangement and a plurality of virtual machine arrangements at least a subset of which together defining at least one application utilizing said IaaS cloud, will be described with reference to FIG. 2. Typically, a server node includes one hypervisor arrangement. The embodiment includes the step of monitoring S10 an infrastructure of the IaaS cloud by monitoring S10 at least one of a physical network, storage arrangements within the physical network, the physical server node, or at least one said plurality of virtual machine arrangements. At some point in time a fault is detected in step S20 in the monitored infrastructure, and at least one application is notified in step S30 of the detected fault on a respective message bus arranged between the hypervisor arrangement and each at least one application. Finally, the method includes the step of automatically managing in step S40 the operation of each at least one application based on the received notifications.

Figure 3:
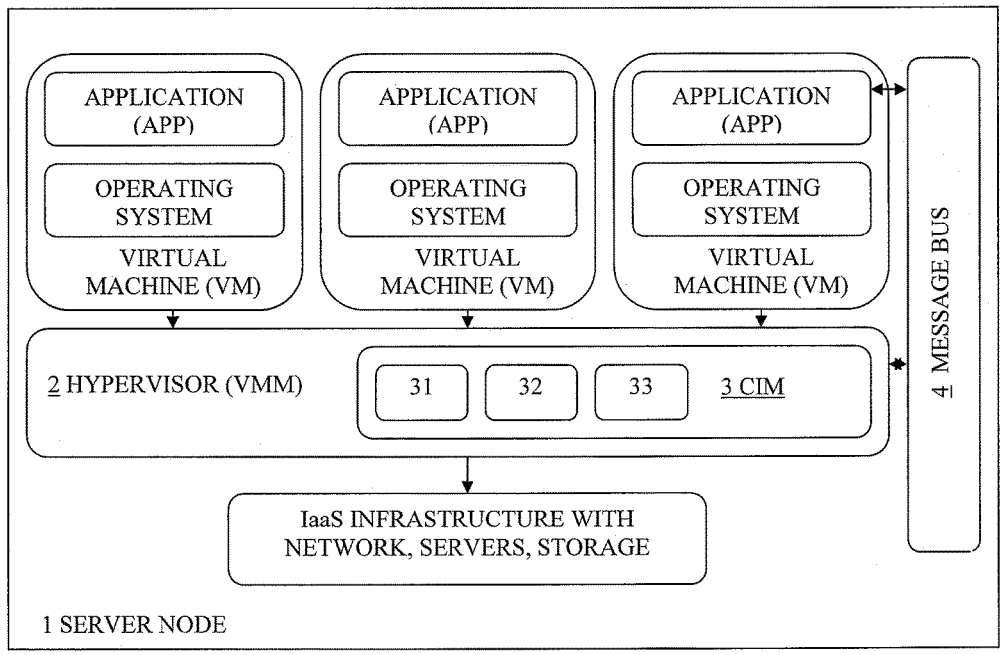
FIG. 3 is a schematic illustration of an embodiment of a server node according to the current disclosure.

With reference to FIG. 3 a basic embodiment of a server node 1 in an IaaS (Infrastructure as a Service) cloud for implementing the above described method according to the present disclosure will be described. The server node 1 includes a hypervisor arrangement 2 and a plurality of virtual machine arrangements (VM) at least a subset of which together defining at least one application (APP) utilizing the IaaS cloud. Typically, the server node 1 includes one hypervisor arrangement 2. The server node 1 further comprises a cloud infrastructure monitor 3 within the hypervisor arrangement 2. The cloud infrastructure monitor 3 in turn comprises a monitor arrangement 31 configured for monitoring an infrastructure of the IaaS cloud by monitoring at least one of a physical network, storage within the physical network, the server node 1, or at least one of said plurality of virtual machine arrangements VM. Further, the cloud infrastructure monitor 3 includes a detector arrangement 32 configured for detecting faults within the monitored IaaS infrastructure, and a notifying arrangement 33 configured for providing notifications of detected faults to affected applications on a message bus 4. Additionally, the server node 1 includes such a respective message bus 4 arranged between the hypervisor arrangement 2 and each at least one application APP for relaying the fault notifications from the cloud infrastructure monitor 3 to the at least one application APP. Although not shown in FIG. 4, the server node 1 typically includes a plurality of message buses 4, one for each defined application. Further, each at least one application APP is configured to automatically manage its operation in response to fault notifications on its associated message bus.

Figure 5:
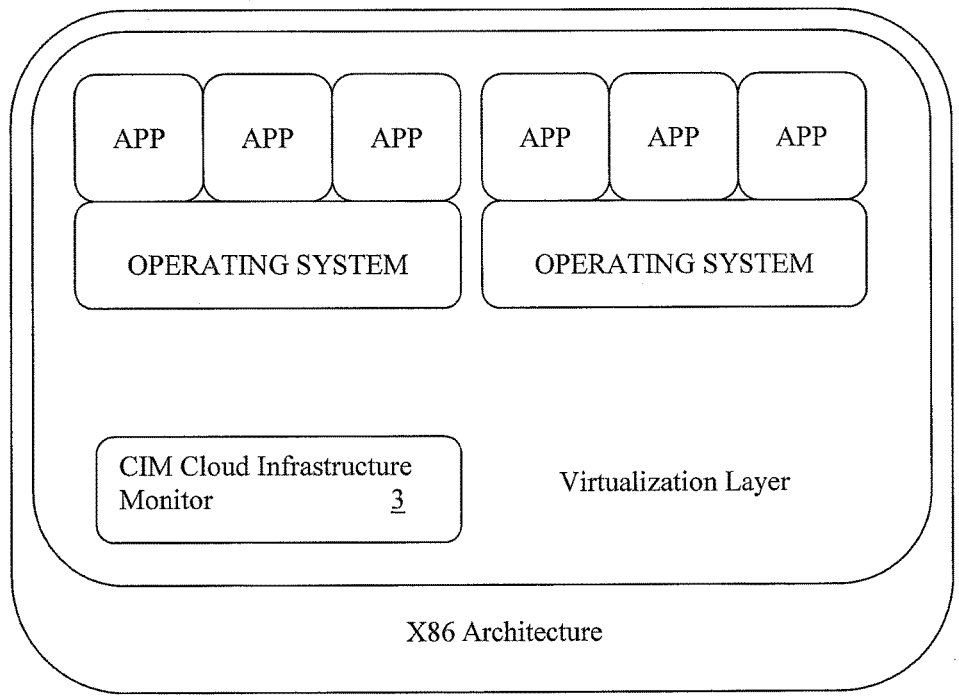
FIG. 5 is a schematic illustration of an embodiment in a X86 architecture.

As mentioned previously, an essential feature of this disclosure is the novel Cloud Infrastructure Monitor (CIM) unit, a so called daemon deployed in each hypervisor to monitor both physical as well as virtualized resources (CPU, memory, NIC, disk . . .). This daemon is connected to a message bus and in case of faults; it sends a notification message on the message bus to all entities connected to it. For example, the Cloud Infrastructure Monitor shall monitor the physical disk (pDISK) as the virtual disk (vDISK) exposed to the VM. If one of them fails, a message is sent on a message bus notified the fault. The placement of that Cloud Infrastructure Monitor with respects to the physical and virtual resources is shown in FIG. 3 and FIG. 5.

The CIM is thus a set of distributed daemons running on hypervisors across the datacenter. This is a completely decentralized solution without a single point of failure. The CIM code shall be optimized for a small footprint and high-efficiency, minimizing the impact of monitoring. There is no need for central coordination of CIMs. Instead, each CIM operates in an independent manner.

In another embodiment, the Cloud Infrastructure Monitor can monitor application parameters as well (memory consumption, request/sec). Values outside of specified ranges will trigger a notification message to be sent on the bus.

Applications that are interested in fault events subscribe to the message bus. The subscription method is described below. In the case of failure, the application acts accordingly based on the fault event.

Figure 4:
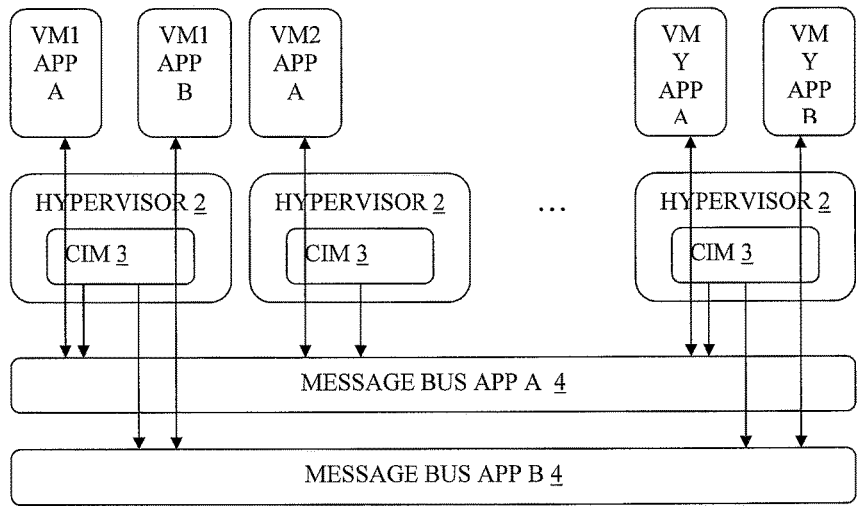
FIG. 4 is a schematic illustration of an embodiment of a plurality of server nodes according to the current disclosure.

With reference to FIG. 4, some aspects related to the scalability of the current disclosure will be described.

Obviously, one single fault notification message bus 4 serving all applications in a datacenter is not a scalable solution. Applications would be overflowed with too many fault notifications or messages that are not of relevance. Moreover, the message bus 4 would be easily overloaded as well.

The solution according to the present disclosure is to enable the client to define an application APP as a set of virtual machines VM that depend on each other to implement a particular service. Consequently, one message bus/application 4 is implemented, thus limiting the amount of receivers of a message. In other words, only applications that are affected by a detected fault will be notified about the fault. Thereby, each virtual machine will only receive notifications of detected failure that are relevant to its operation. Thus, the message buses operate on a per application basis.

In the example above, two applications are depicted, APP_A and APP_B. As can be seen, two different message buses 4 carry the notification information, one for each application.

As mentioned before the CIM (deployed in the hypervisor) is a decentralized daemon. It is very important for the CIM to connect to the right message buses 4 for notifying the appropriate applications. In the example above, in the hypervisor hosting virtual machines of APP_A and APP_B the CIM must connect to both message buses 4. The hypervisor 2 hosting only VM2 (APP_A) only connects to the message bus APP_A 4.

Figure 6:
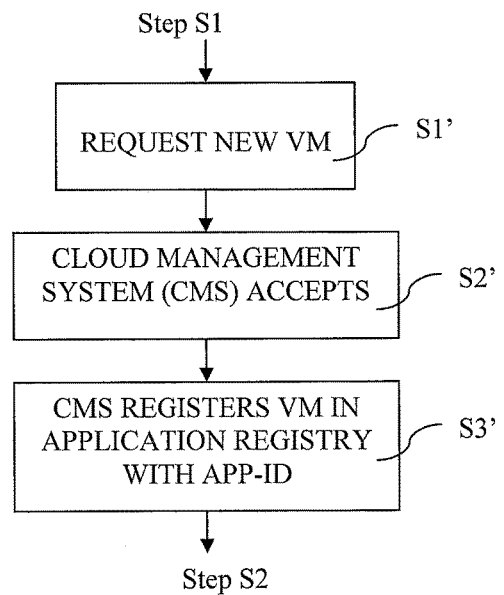
FIG. 6 is flow chart according to an embodiment of the current disclosure.

With reference to FIG. 6, the particulars concerning how to initiate and set up the technology of the present disclosure in a server node 1 in a IaaS cloud will be described. The term bootstrapping is used to denote how a virtual machine arrangement is registered and set up on a server node 1 in the IaaS cloud Initially, a request for a virtual machine is sent, in step S1', from the client to the Cloud Management System CMS. Assuming the request can be fulfilled, the Cloud Management System CMS accepts, in step S2', the request and sends a reply back to the client. The client must specify an Application_Name, which in the system will be associated with an APP_ID. As described before, the application represents a set of virtual machines that depend on each other for providing a service.

The Cloud Management System CMS will register, in step S3', the virtual machine in an Application Registry with an Application_Name, an Application_ID and a VM_fingerprint. A VM_fingerprint could be for example the MAC address of that VM (if system wide MAC allocation is used).

Consequently, according to a further embodiment, the server node 1 includes an application registry, which manages, and stores e.g. Application Name, Application_ID and VM fingerprint for each application. In addition, the server node 1 includes a bus registry, which is configured for maintaining and updating a register of each message bus and its application.

The application registry and/or the bus registry can beneficially be located in another server node.

The Cloud Management System CMS will then start or deploy, in step S2, the new virtual machine in a given host e.g. given server node 1.

Figure 7:
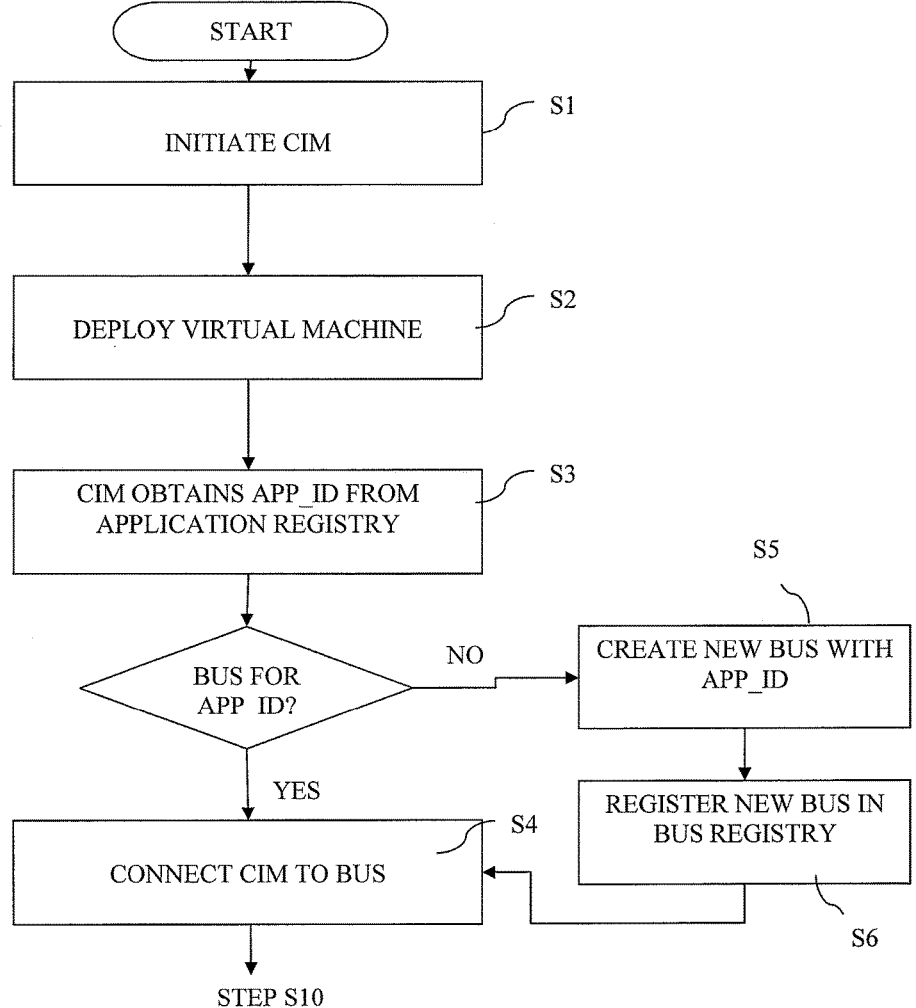
FIG. 7 is a flow chart of another embodiment of the current disclosure.

With reference to FIG. 7, a further embodiment related to the initiation and setup of the current disclosure will be described.

The second phase of bootstrapping is about connecting the Cloud Infrastructure Monitors to the correct message bus. When a host server node 1 starts, the CIM daemon is automatically initiated in step S1. When at least one virtual machine is deployed, in step S2, on this host (according to the previously described embodiment), the CIM daemon obtains, in step S3, the APP_ID from the application registry for that virtual machine using the VM_fingerprint. With the APP_ID, the CIM queries the Bus Registry to obtain the message bus address for that specific application. If that message bus does not exist, a new message bus is created, in step S5, and registered, in step S6, in the Bus Registry. The daemon is then able to connect, in step S4, to the message bus. If the bus already exists, the daemon has simply to connect to it, in step S4. Subsequently, the process of monitoring the IaaS infrastructure according to the emdomeint of FIG. 2 proceeds, in step S10.

The process for an application connecting to a message bus is similar.

Innumerous type of fault notification messages can be defined. Here a non-limiting example of such a message is disclosed. In this embodiment of the present disclosure, the fault notification message includes the ID of the application affected by this fault (APP_ID). It includes the IP address of the message source (CIM). It includes the fault_type (e.g., service stopped, service irresponsive). It includes the faulty service (e.g., network, storage). It includes the faulty device (e.g., eth0).

Application: APP_ID
Notification_Source: IP_address
Fault_Type: stopped
Faulty_Service: network
Faulty_Dev: eth0

Within a IaaS cloud, virtual machine arrangements can be migrated between different server nodes. A migration can be a result of a detected fault according to the embodiments of the current disclosure, or something that is caused by e.g. replacement ore relocation of current hardware, maintenance, optimization of usage of server hardware etc. In order to support migration whilst maintaining full fault management according to the present disclosure, some considerations need to be taken.

Figure 8:
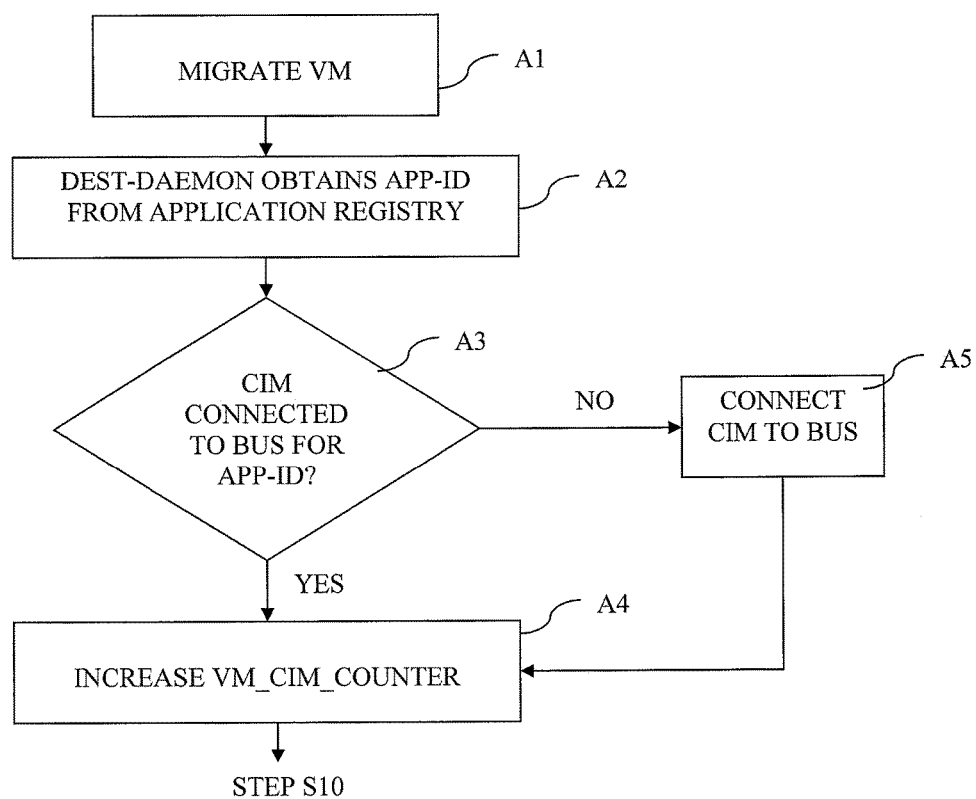
FIG. 8 is a further flow chart of an embodiment of the current disclosure.

With reference to FIG. 8, an example embodiment related to migration of a virtual machine from a current server node to a target server node will be described.

According to known measures, a virtual machine can be moved or migrated freely amongst hosts when a Cloud Management System so decides. That could interfere with the current disclosure since the old hypervisor may be connected to a message bus it no longer needs to. The solution for that problem is the following, as described with reference to FIG. 8. At some point in time, a migration request or order is received. In response to the received migration request, the step of migrating, in step A 1, at least one of the virtual machine arrangements from its current server node or host to a target server node is performed. In order to prevent the current hypervisor from being connected to a message bus it no longer needs to, also the CIM of the host and the target needs to be updated with reference to the migrated virtual machine arrangement. Consequently, when migration occurs, the Cloud Management System notifies the daemon in the hypervisor. If the local hypervisor does not contain any other virtual machine that is part of the same application, it disconnects from the respective message bus. Since the current server node will have a smaller number of virtual machine arrangements after the migration a so called VM_CIM_Counter for the current server node is decreased, that is, reduced the VM_CIM_COUNTER for the associated message bus in the current node. The counter represents the number of virtual machines in the current hypervisor belonging to the same application.

After migration, the destination CIM will probe, in step A2, the Application Registry to obtain an application identity APP_ID for the virtual machine arrangement from the application registry. The destination CIM will then verify, in step A3, if it is already connected to the message bus for that APP_ID. If it is not, a connection will be made, in step A5. In order to indicate that the number of virtual machine arrangements of the target host has increased the corresponding VM_CIM_Counter for the target server node is increased, in step A4. Subsequently, the process of monitoring the IaaS infrastructure according to the embodiment of FIG. 2 proceeds, in step S10.

In one embodiment of this invention, the Advanced Message Queuing Protocol (AMQP) as a message bus for delivering fault notification messages. AMPQ is a widely used open standard for passing messages between applications. AMQP is asynchronous in nature and thus message needs to be pulled out of an inbox at the receiver.

Due to the asynchronous nature, two methods are disclosed for retrieving messages. In the first one, applications poll the message bus to read notification messages at regular time intervals. In the second one, applications only read the message bus when a usual situation is detected. An example of that would be a TCP connection time-out.

Figure 9:
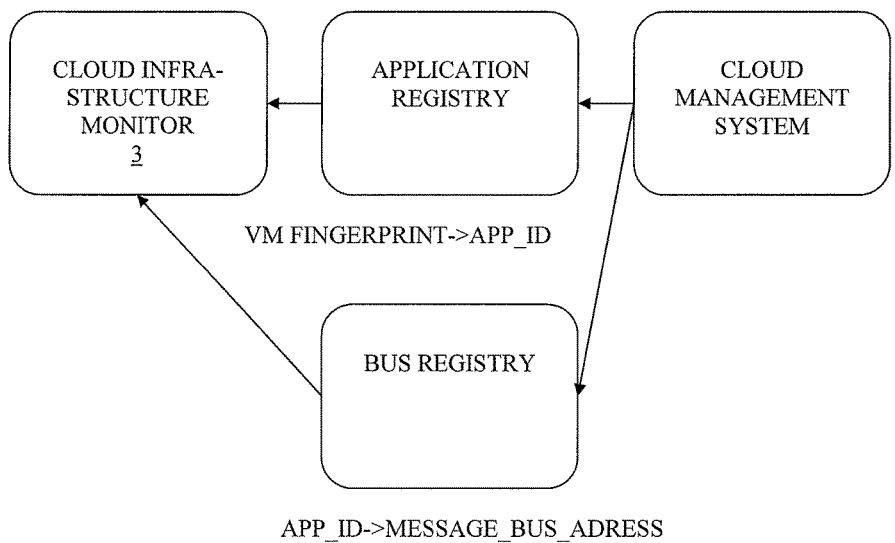
FIG. 9 illustrates a further embodiment of the current disclosure.

With reference to FIG. 9, a schematic illustration of the relation and cooperation between the different parts of the cloud is shown. As indicated, both the novel cloud infrastructure monitor 3 of the current disclosure and the cloud management system communicate with the application registry and the bus registry.

Figure 10:
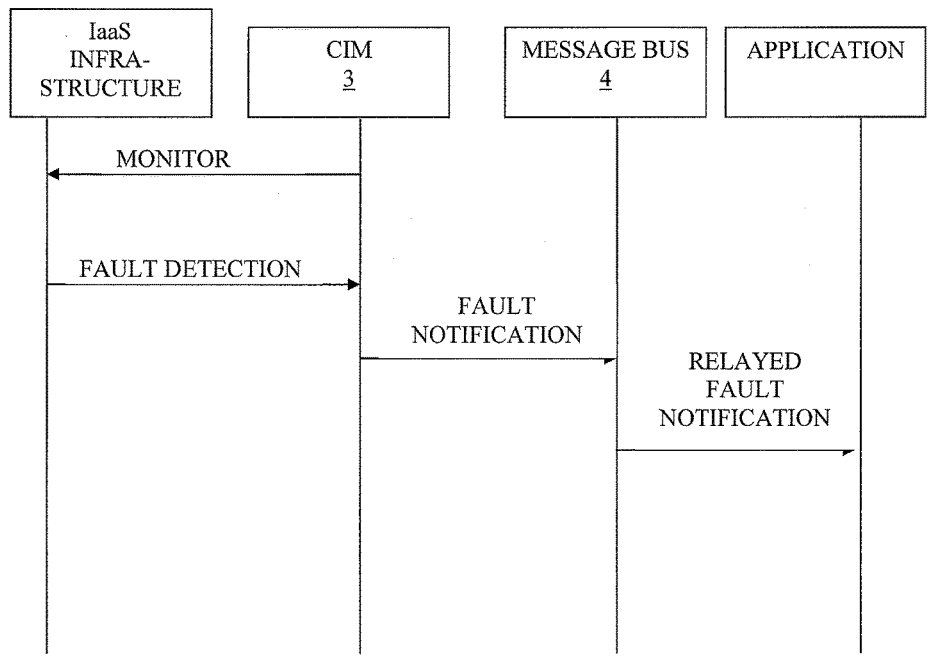
FIG. 10 illustrates a signaling scheme according to an embodiment of the current disclosure.

An example embodiment of the signalling in the present disclosure is illustrated in FIG. 10. As indicated in the drawing a CIM 3 monitors the IaaS infrastructure. The monitoring can comprise supervising predetermined parameters or detecting predetermined events. At some point in time, the CIM 3 detects a fault in some part of the IaaS infrastructure, as indicated by the signal from the IaaS infrastructure to the CIM 3. One or more fault notification messages are then delivered to one or more relevant message bus 4 depending on the fault detected. Based on information concerning which applications are affected or interested in the detected fault, the fault notification is relayed to the applications or applications, which then can manage their respective operation based on the fault notification.

Some of the automatic measures that each application can take upon receiving a fault notification are presented in a non limiting manner below.

Spin-off a new VM from the same image, in the same or
     another datacenter
  Stop the faulty VM
  Stop process communicating with VM under faulty conditions
  Move data
  Notify load balancer to stop directing new requests to
     affected VM
  Perform VM migration, depending on type of fault The actions to be taken are very application dependent. As stated before, the application itself is the best one to decide what to do under faulty circumstances.

At least some of the steps, functions, procedures, and/or blocks described above may be implemented in software for execution by a suitable processing device, such as a microprocessor, Digital Signal Processor (DSP) and/or any suitable programmable logic device, such as a Field Programmable Gate Array (FPGA) device.

Figure 11:
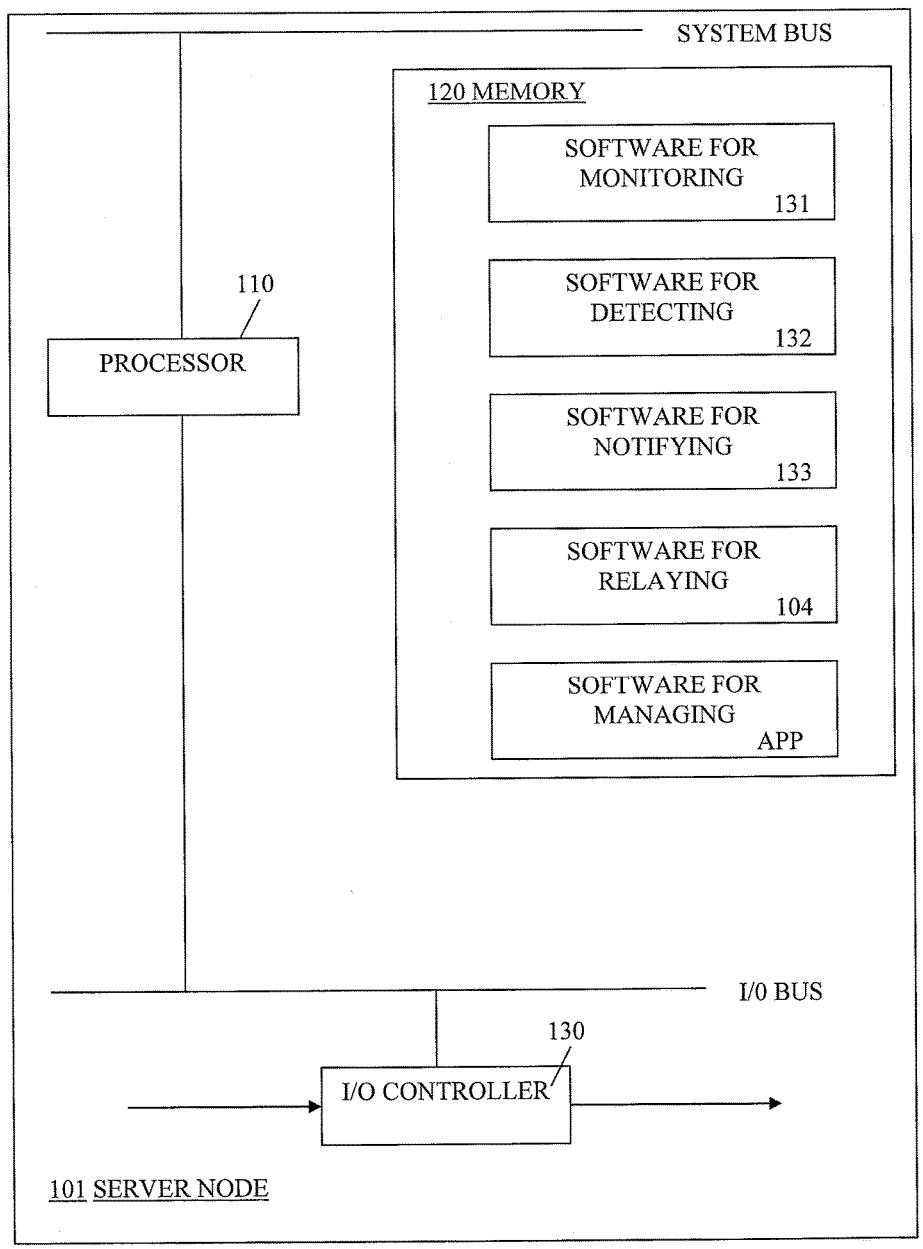
FIG. 11 illustrates a computer implementation of an embodiment of the current disclosure.

In the following, and example of an embodiment of a computer implementation of a server node 101 according to the current disclosure will be described with reference to FIG. 11. This embodiment is based on a processor 110, for example a micro processor, which executes a software component 131 for monitoring an infrastructure of the IaaS cloud by monitoring at least one of a physical network, storage arrangements within the physical network, the physical server node, or at least one of said virtual machine arrangements; a software component 132 for detecting a fault in the monitored infrastructure, and a software component 133 for notifying the at least one application of a detected fault on a respective message bus arranged between the hypervisor arrangement and each at least one application, and a software component 104 for relaying fault notifications between the hypervisor and at least one application, and a software component APP for automatically managing the operation of each at least one application based on the received notifications. These software components are stored in a memory 120. The processor 110 communicates with the memory over a system bus. Signals are received by an input/output (I/O) controller 130 controlling an I/O bus, to which the processor 110 and the memory 120 are connected. In this embodiment, the signals received by the I/O controller 130 are stored in the memory 120, where they are processed by the software components. Software component 110 may implement the functionality of the monitoring step S10. Software component 131 may implement the functionality of the fault-detecting step S20. Software component 132 may implement the functionality of the notification-receiving step S30, and the software component APP may implement the functionality of the managing step S40.

The I/O unit 130 may be interconnected to the processor 110 and/or the memory 120 via an I/O bus to enable input and/or output of relevant data such as input parameter(s) and/or resulting output parameter(s).

At least some of the steps, functions, procedures, and/or blocks described above may be implemented in software for execution by a suitable processing device, such as a microprocessor, Digital Signal Processor (DSP), and/or any suitable programmable logic device, such as a Field Programmable Gate Array (FPGA) device.

It should also be understood that it might be possible to re-use the general processing capabilities of the network nodes. For example this may, be performed by reprogramming of the existing software or by adding new software components.

The software may be realized as a computer program product, which is normally carried on a computer-readable medium. The software may thus be loaded into the operating memory of a computer for execution by the processor of the computer. The computer/processor does not have to be dedicated to only execute the above-described steps, functions, procedures, and/or blocks, but may also execute other software tasks.

A major advantage of the embodiments of the current disclosure is that it gives each application the opportunity to appropriately recover from fault conditions. Existing state of the practice does not allow for such a solution. The solution herein presented is scalable and distributed.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] Rackspace Cloud Monitoring API, http://www.rackspace.com/cloud/public/monitoring/

[2] Amazon CloudWatch, http://aws.amazon.com/cloudwatch/

[3] Amazon Simple Notification Service, http://aws.amazon.com/sns/

The invention claimed is:

1. A server system comprising at least two server nodes in an Infrastructure as a Service (IaaS) cloud, each server node comprising a hypervisor and a plurality of virtual machines at least a subset of which depend on each other to provide a service and together defining at least one application (APP) distributed across said at least two server nodes utilizing said IaaS cloud, each server node configured for deploying the at least the subset of the plurality of virtual machines defining the at least one application, each server node comprising;
   a cloud infrastructure monitor within the hypervisor, wherein each server node is configured to initiate said cloud infrastructure monitor upon startup of said server node, said cloud infrastructure monitor comprises:
      a monitor arrangement configured for monitoring an infrastructure of said IaaS cloud by monitoring at least one of a physical network, storage within said physical network, the server node, or at least one of said plurality of virtual machines;
      a detector arrangement configured for detecting faults within said monitored IaaS infrastructure;
      a notifying arrangement configured for providing notifications of detected faults on a message bus;
   the server system further comprising:
      a respective message bus arranged between at least two hypervisors located in different server nodes and each said at least one application for relaying said fault notifications from said cloud infrastructure monitor to said at least one application;
      each said at least one application is configured to automatically manage its operation in response to received fault notifications by performing at least one operation based on a type of the one or more faults associated with the fault notifications, and
   wherein each at least one server node is connectable to an application registry configured to store application identities for each said at least one application, and a bus registry configured to store an identifier of the respective message bus for each said at least one application, and wherein said cloud infrastructure monitor is configured to obtain an application identity for said at least one application from said application registry, and further configured for creating a new message bus if no message bus is available in said bus registry for said application, and registering said new message bus in said bus registry, and each server node is further configured to connect said cloud infrastructure monitor to sad respective message bus or said new message bus for said application.

2. The server system according to claim 1, wherein said application registry and/or said bus registry are located within at least one server node of the at least two server nodes.

3. The server system according to claim 1, wherein said at least one server node is configured to communicate with an application registry and/or a bus registry located within another server node.

4. The server system according to claim 1, wherein said message bus is configured to utilize Advanced Message Queuing Protocol.

5. The server system according to claim 1, wherein said at least one application is configured to read notification messages from said message bus at predetermined time intervals.

6. The server system according to claim 1, wherein said at least one application is configured to read notification messages based on a predetermined condition.

7. The server node according to claim 6, wherein said predetermined condition comprises a TCP connection time-out.

8. The server system according to claim 1, wherein said notifications comprise at least one of an application identity for applications affected by a detected fault, an IP address of said cloud infrastructure monitor, a type for each detected fault, an indication of a faulty service, an indication of a faulty device.

9. The server system according to claim 1, wherein each of said server node is configured to automatically manage its associate applications by migrating a virtual machine from the server node to a target server node in response to a detected fault.

10. A method of fault management in a server system comprising at least two server nodes in an Infrastructure as a Service (IaaS) cloud, each server node comprising a hypervisor and a plurality of virtual machines at least a subset of which depend on each other to provide a server and together defining at least one application distributed across said at least two server nodes utilizing said IaaS cloud, wherein each server node performs operations comprising:
deploying at least the subset of the plurality of virtual machines to define the application; initiating a cloud infrastructure monitor for monitoring an infrastructure of said IaaS cloud by monitoring at least one of a physical network, storage arrangements within said physical network, said physical server node, or at least one of said plurality of virtual machine arrangements;
detecting a fault in said monitored infrastructure;
providing notifications of detected faults on a message bus, a respective message bus arranged between at least two hypervisors located in different server nodes and said at least one application for providing said fault notifications to said at least one application notifying said at least one application of a detected fault on the respective message bus arranged between the hypervisor and said at least one application,
automatically managing the operation of said at least one application based on said received notifications by performing at least one operation based on a type of the one or more faults associated with the fault notifications, wherein said cloud infrastructure performs obtaining an application identity for said application from an application registry, creating a new message bus if no message bus is available for said application, and registering said new bus in a bus registry, and
connecting the cloud infrastructure monitor to the bus or new bus for said application.

11. The method according to claim 10, wherein said automatically managing the operation of each at least one application comprises initiating a new virtual machine in response to a notified fault.

12. The method according to claim 10, wherein said automatically managing the operation of each at least one application comprises stopping a virtual machine in response to a notified fault.

13. The method according to claim 10, wherein said automatically managing the operation of each at least one application comprises stopping any process communicating with a virtual machine in response to a notified fault.

14. The method according to claim 10, wherein said automatically managing the operation of each at least one application comprises moving data in response to a detected fault.

15. The method according to claim 10, wherein said automatically managing the operation of each at least one application comprises notifying a load balancer to stop directing new requests to a virtual machine in response to a detected fault.

16. The method according to claim 10, wherein said automatically managing the operation of each at least one application comprises migrating a virtual machine from a current server node to a target server node in response to a detected fault.

17. The method according to claim 16, further comprising:
in response to a received migration request, migrating at least one of said virtual machine arrangements to a target server node,
reducing a VIM_CIM_COUNTER for said associated message bus in said node, a cloud infrastructure monitor of said target server node obtaining an application identity for said virtual machine arrangement from an application registry,
if said cloud infrastructure monitor is already associated with a message bus for said application, then increasing the VM_CIM_COUNTER for said message bus in said target server node;
connecting said cloud infrastructure monitor to a message bus for said application.

* * * * *